Figure 1:
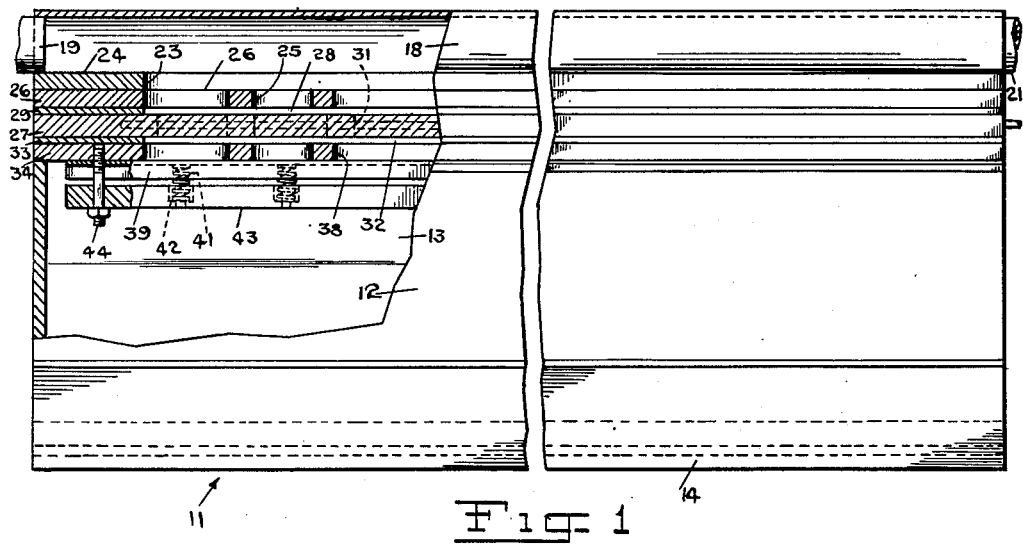

June 1, 1954     W. J. BENNES ET AL     2,679,661
METHOD AND APPARATUS FOR FORMING FILMS
Filed July 21, 1949     3 Sheets-Sheet 1

INVENTOR.
WILLIAM J. BENNES,
CHARLES E. LEYES.
BY
ATTORNEYS

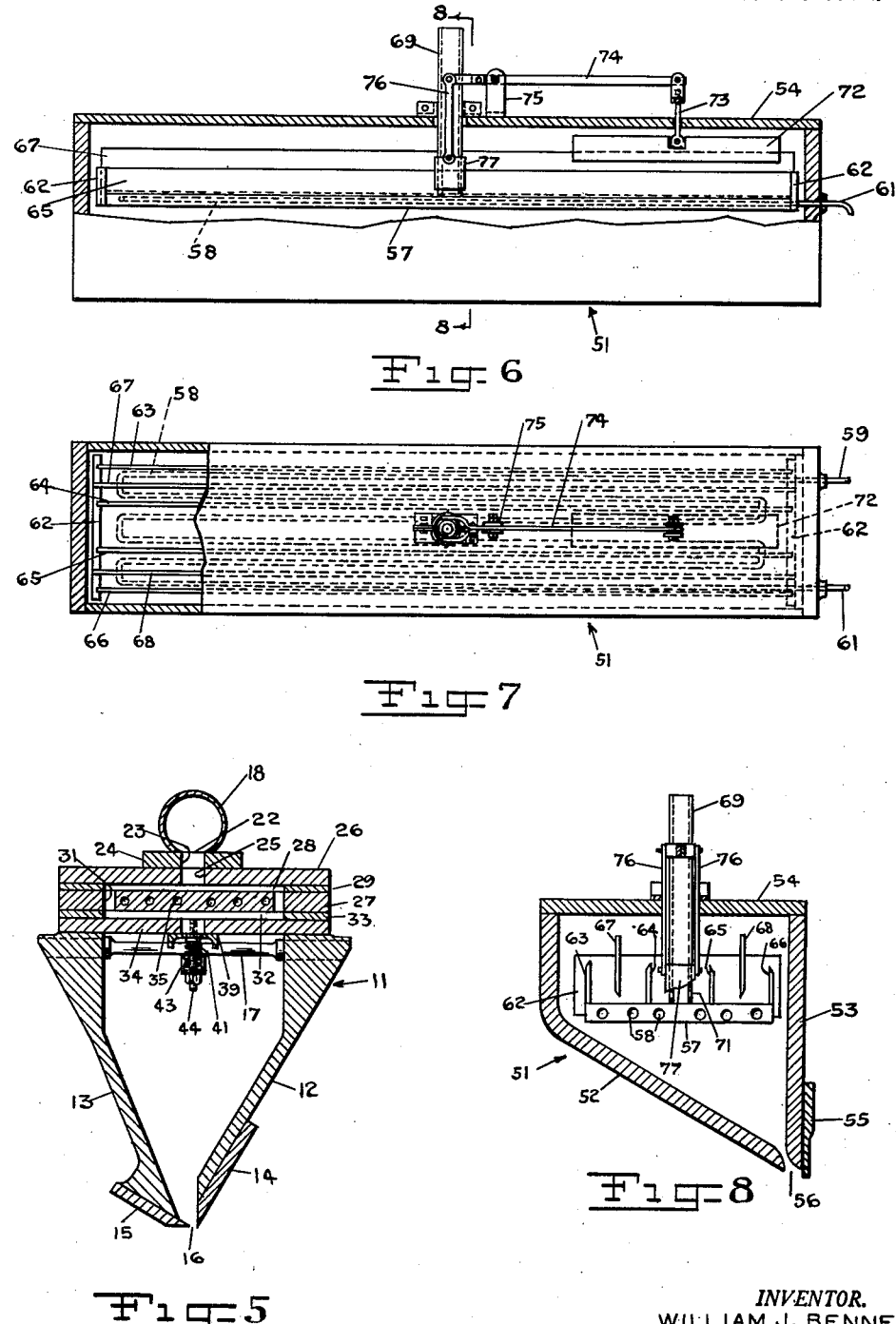

INVENTORS
WILLIAM J. BENNES
CHARLES E. LEYES
BY
ATTORNEYS

Patented June 1, 1954

2,679,661

UNITED STATES PATENT OFFICE 2,679,661

METHOD AND APPARATUS FOR FORMING FILMS

William J. Bennes, Irvington, and Charles E. Leyes, Union, N. J., assignors to Celanese Corporation of America, New York, N. Y., a corporation of Delaware Application July 21, 1949, Serial No. 105,982

14 Claims. (Cl. 18—15)

This invention relates to the preparation of films, and relates more particularly to an improved process and apparatus for preparing films.

Films are customarily prepared by extruding a film-forming material through an aperture in a hopper onto a smooth surface, such as a casting wheel or band, or into a hardening medium. It is important that the thickness of the films be uniform, since any material variations in thickness will render the films commercially unacceptable. Many expedients have been suggested for obtaining the requisite uniformity in the thickness of the films. For example, it has been proposed to employ a hopper of massive construction so that the pressure of the film-forming material would not distort the hopper or the extrusion aperture. It has also been proposed to provide a plurality of adjusting means along the extrusion aperture by means of which the aperture size could be varied to control the thickness of the films being produced. Another expedient that has been proposed is the insertion of a tightly coiled wire in the hopper adjacent the extrusion aperture. The coiled wire was supported on elevating screws, which could be adjusted to move the coiled wire with respect to the extrusion aperture to provide a variable obstruction to the flow of film-forming material to said aperture thereby effecting a degree of control in thickness of the films. While these several expedients produced some improvements in the uniformity of film thickness, they were not successful in that irregular variations in film thickness still occurred. Moreover, with these expedients, frequent readjustments were necessary to maintain the film thickness within commercially acceptable limits.

It is an important object of this invention to provide a process and apparatus for preparing films which will be free from the foregoing and other disadvantages of the prior processes and apparatus.

A further object of this invention is the provision of an improved process and apparatus for preparing films, which will yield films having a substantially uniform thickness.

Other objects of this invention, together with certain details of construction and combinations of parts, will be apparent from the following detailed description and claims.

We have now discovered that the variations in the thickness of films produced by prior processes and apparatus are due in large part to irregularities in the flow pattern of the film-forming material through the hopper. Because of these irregularities in flow pattern, the pressure in the hopper varies from point to point and, as a result, different quantities of film-forming material flow to different parts of the extrusion aperture. These irregularities in flow pattern are in part the result of temperature differentials in the hopper and also give rise to further temperature differentials in the hopper, which alter the viscosity of the film-forming material and produce further differences in the flow of the film-forming material to the extrusion aperture. The temperature differentials also affect the physical properties of the films, producing hard spots and other defects therein. Since none of the expedients previously suggested for obtaining a film of uniform thickness eliminates the irregularities in the flow pattern of the film-forming material they can be of only limited utility.

In accordance with this invention, the irregularities in the flow pattern of the film-forming material are eliminated by causing a stream of the film-forming material of restricted thickness and having a width substantially equal to that desired in the finished film to pass in heat-exchange relation to a heating medium, whereby all of the film-forming material is brought to a uniform temperature and is blended and thereafter, without materially reducing the width of the stream, causing the heated film-forming material to pass through an extrusion aperture to shape the same into a film. With the irregularities in the flow pattern of the film-forming material eliminated, the temperature and pressure in the hopper no longer vary in an irregular manner and, as a result, there are no variations in the flow of the film-forming material to the extrusion aperture. Accordingly, the films extruded from this aperture will have a substantially uniform thickness.

In passing the film-forming material in heat-exchange relation to a heating medium, it is preferred that the stream of film-forming material be reduced to a thickness of less than about 0.25 inch at one or more points in its path. If a thicker stream is employed, there is the possibility that the temperature of the film-forming material will not be uniform, which will give rise to irregularities in the thickness of the films produced therefrom. The use of a thin stream is also advantageous in that it effects a blending of the film-forming material thereby eliminating any non-uniformities therein. It is also preferred, in passing the film-forming material in heat-exchange relation to a heating medium, to dispose the stream of film-forming material in a horizontal plane to minimize the effects of the difference in flow rate between the surface and the center of the stream, which difference tends to produce variations in the temperature of the film-forming material. Since, in carrying out our invention, the film-forming material is brought to the proper temperature prior to its extrusion as a film, it is possible to eliminate the heating units previously positioned in the supply lines for the film-forming material, thereby effecting a saving in equipment cost and space and in the power requirements for pumping the film-forming material to the extrusion aperture. Moreover, when the extrusion temperature does not differ too greatly from room temperature, it is also possible to eliminate the heating jackets from the casting hoppers since the heated film-forming material will maintain the hoppers at a constant temperature, thereby effecting a further saving in equipment cost and power requirements.

The process and apparatus of our invention may advantageously be employed in conjunction with the process and apparatus set forth in our copending application Serial No. 93,352 filed May 14, 1949, now Patent No. 2,644,195. As described in said copending application, a stream of film-forming material is passed through a hopper having an extrusion aperture and a portion only of the film-forming material, say from about 50 to 75%, is diverted from the stream to the extrusion aperture by means extending the full length of the extrusion aperture, while the remainder of the film-forming material, say from about 50 to 25%, is passed through the hopper without diversion.

The process of this invention may be carried out with scraper hoppers which are open to the atmosphere and in which the film-forming material flows through the aperture under the influence of gravity. It may also be carried out with pressure hoppers which are closed to the atmosphere and in which a hydraulic pressure is developed by any suitable means, such as a pump, to force the film-forming material through the extrusion aperture. The hoppers may be of any suitable cross-section and may have any desired length depending upon the width of the film to be extruded therefrom. The extrusion aperture may be either fixed or adjustable and may be constructed of highly finished blades fastened to the body of the hopper, as is well known in the art, or in any other desired manner.

This invention may be employed for the preparation of films made from melts and other compositions containing a film-forming material. However, it is especially useful for the preparation of films from dope, comprising a solution of film-forming ingredients in a volatile solvent. Among the film-forming materials that may be employed are organic derivatives of cellulose including cellulose esters, such as cellulose acetate, cellulose propionate, cellulose butyrate, cellulose acetate-propionate and cellulose acetate-butyrate; cellulose ethers, such as ethyl cellulose and benzyl cellulose; and cellulose ether-esters. In addition, other film-forming materials may be employed, such as vinyl chloride-vinyl acetate copolymers, polyvinylidene chloride, polystyrene or polyethylene. The volatile solvents in which the film-forming materials may be dissolved to form a dope include ketones, such as acetone or a mixture of acetone and ethyl alcohol; chlorinated hydrocarbons such as chloroform, methylene dichloride and ethylene dichloride in combination with alcohols; aromatic hydrocarbons such as benzene and toluene; petroleum spirit, pentanes, or organic acids such as acetic acid. The dope may also contain plasticizers, such as triphenyl phosphate, diethyl phthalate, or ethyl phthalyl ethyl glycollate, dyes and other agents to modify the properties of the films produced therefrom.

Figure 2:
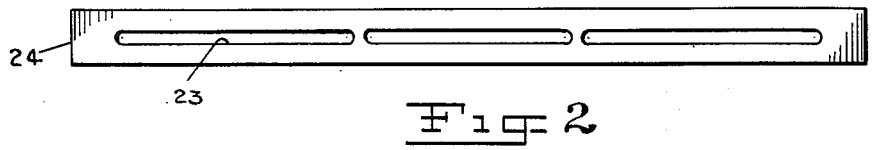
Figure 3:
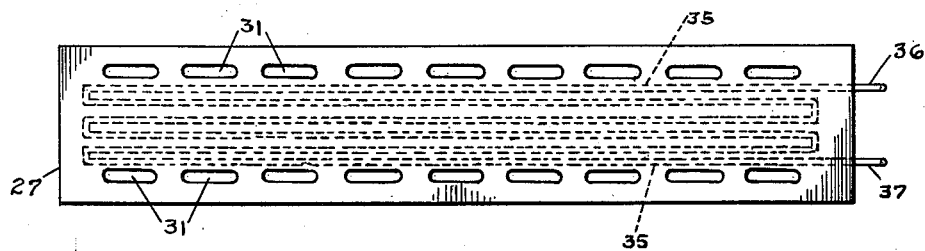
Figure 4:
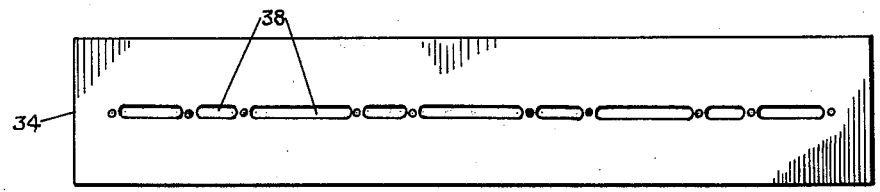
Figure 9:
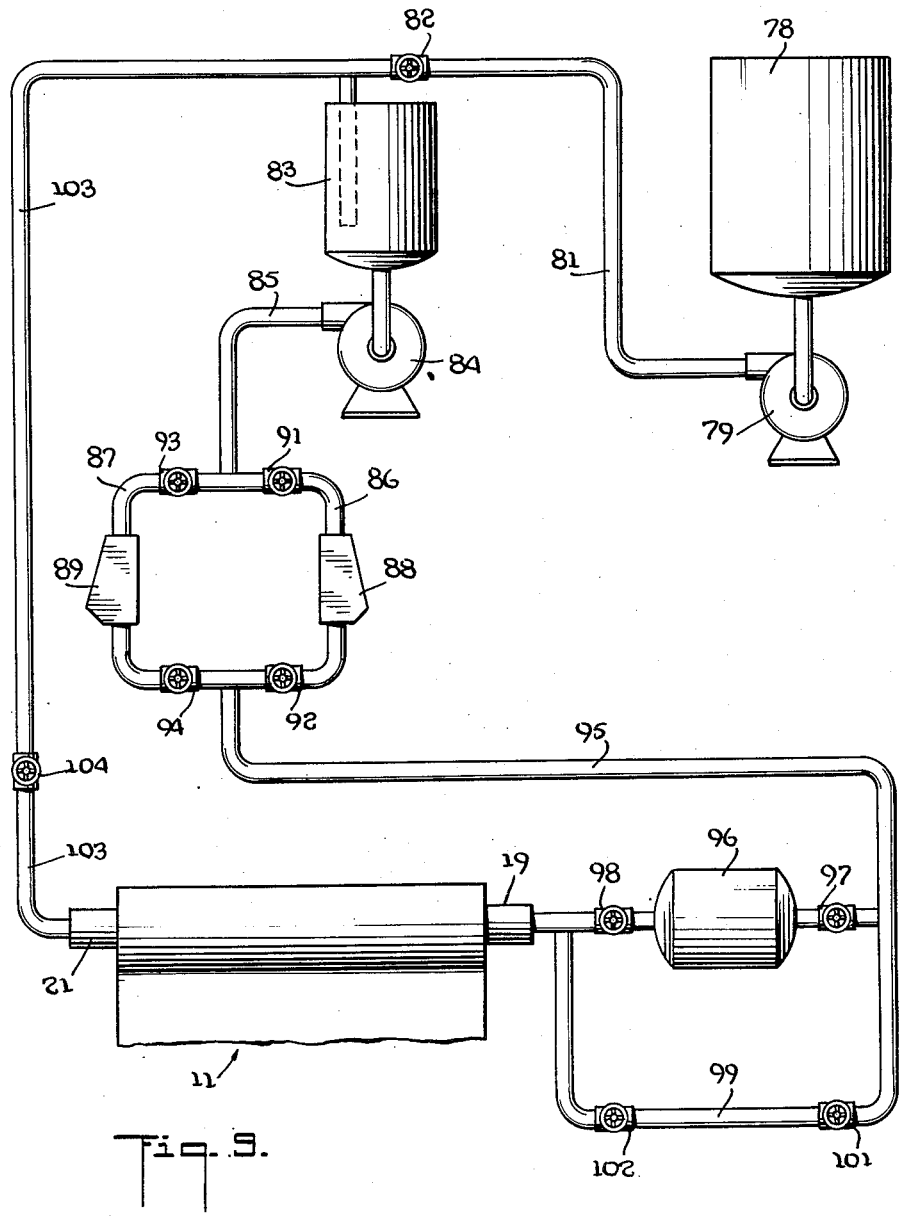

A preferred embodiment of our invention is illustrated in the accompanying drawings, in which Fig. 1 is a front elevational view, partly in cross section, of a pressure hopper incorporating our invention, Figs. 2, 3 and 4 are detail views on a smaller scale of the hopper shown in Fig. 1, Fig. 5 is a cross-sectional view of the hopper shown in Fig. 1, Fig. 6 is a front elevational view, partly in cross-section, of a scraper hopper incorporating our invention, Fig. 7 is a plan view, partly broken away, of the hopper shown in Fig. 6, Fig. 8 is a cross-sectional view, taken on the line 8—8 in the direction of the arrows, of the hopper shown in Fig. 6, and Fig. 9 is a diagrammatic view showing the circulation system for the film-forming material.

Like reference numerals refer to like parts throughout the several views of the drawings.

Referring now to Figs. 1 to 5 of the drawings, the reference numeral 11 designates generally a pressure hopper, comprising side walls 12 and 13 to which blades 14 and 15, defining an extrusion aperture 16, are adjustably fastened as is well understood in the art. The walls 12 and 13 are joined by tie rods 17 to prevent distortion of the hopper 11 when a film-forming material is entered into said hopper under pressure. The hopper 11 is provided with a header 18 extending longitudinally thereof and into which a film-forming material flows from a conduit 19. A portion of the film-forming material passes through the header 18 without diversion and is discharged therefrom through a conduit 21. The remainder of the film-forming material flows through an opening 22 in the header 18 into slots 23 formed in a plate 24 and, after passing through the slots 23, flows through slots 25 provided in a plate 26 positioned immediately below the plate 24 and spreads over the upper surface of a plate 27 within a space 28. The thickness of space 28 is determined by the thickness of a spacer 29 which is interposed between the plate 26 and the plate 27. The film-forming material then flows through slots 31 adjacent the longitudinal edges of the plate 27 into a space 32 formed by a spacer 33 positioned between the under surface of the plate 27 and a plate 34. As the film-forming material flows through the spaces 28 and 32, at least one and preferably both of which have a thickness of less than 0.25 inch, it is thoroughly blended and is brought uniformly to the proper temperature for extrusion by a heating medium, which flows into enclosed channels 35 in the plate 27 from a conduit 36 and which is discharged from the channels 35 through a conduit 37. From the space 32, the film-forming material flows into slots 38 in the plate 34. The slots 38 are yieldably closed by a channel-iron closure member 39, which is urged against the plate 34 by means of springs 41 carried in apertures 42 in a bar 43 adjustably fastened to the plate 34 by bolts 44. When the pressure of the film-forming material in the space 32 exceeds a predetermined minimum, the closure member 39 is forced away from the plate 34, permitting the film-forming material to flow through the slots 38 to the extrusion aperture 16. This permits a sufficient pressure to be built up in the conduit 18 to obtain adequate circulation of the film-forming material 11, without simultaneously applying an excessive pressure to the walls 12 and 13.

Referring now to Figs. 6 to 8 of the drawings for a modification of our invention, the reference numeral 51 designates generally a scraper hopper, comprising side walls 52 and 53, a top wall 54, and a blade 55 which together with the side wall 52 defines an extrusion aperture 56. Positioned horizontally within the hopper 51 is a plate 57 extending substantially the full length of the extrusion aperture 56. The plate 57 is provided with enclosed channels 58 into which a heating medium flows through a conduit 59 and from which it is discharged through a conduit 61. Plates 62 are fastened to the ends of the plate 57. Mounted between the plates 62 are knife-edge blades 63, 64, 65 and 66 whose lower ends abut the plate 57, and knife-edge blades 67 and 68 whose lower ends are spaced from said plate a distance of less than 0.25 inch to form a series of weirs.

A film-forming material is entered into the hopper 51 through a conduit 69, which extends through the top wall 54, and is discharged through apertures 71 in the conduit 69 into the trough formed by the blades 64 and 65. The film-forming material then flows in a thin stream over the upper edges of the blades 64 and 65 into the troughs formed by the blades 64 and 67 on the one side and the blades 65 and 68 on the other. From these troughs, the film-forming material flows in a thin stream under the blades 67 and 68 in intimate contact with the plate 57 into the troughs formed between the blades 63 and 67 on the one side and the blades 66 and 68 on the other. The film-forming material then flows in a thin stream over the blades 63 and 68 to the extrusion aperture 56. In this manner, the film-forming material is not only brought uniformly to the proper temperature for extrusion, but is also thoroughly blended to eliminate any non-uniformities therein as it flows from the conduit 69 to the extrusion aperture 56. As a result, the films extruded from said aperture have a substantially uniform thickness and are completely free from hard spots or other defects.

A constant level of film-forming material is maintained automatically between the blades 64 and 65 by means of a mechanism including a float 72, which is fastened with a bolt 73 to one end of a lever arm 74 that is pivotally mounted on a bracket 75. At its other end, the lever arm 74 is bifurcated and carries straps 76, which are fastened to a sleeve 77 that encircles the conduit 69 in the vicinity of the apertures 71. When the level of the film-forming material between the blades 64 and 65 is too low, the float 72 drops, raising the sleeve 77 so as to permit a greater flow of the film-forming material through the apertures 71. When, on the other hand, the level of the film-forming material is too high, the float 72 rises, lowering the sleeve 77 so as to reduce the flow of the film-forming material through the apertures 71. During operation, the float 72 will continuously adjust the flow of the film-forming material through the apertures 71 so as to maintain a constant level of the film-forming material between the blades 64 and 65.

In Fig. 9 there is shown the film-forming material circulation system somewhat along the lines of that disclosed in Patent No. 2,644,195 which may advantageously be employed with the apparatus of the instant invention. Here the reference numeral 78 designates a storage tank from which a film-forming material is forced by means of a pump 79 through a conduit 81, provided with a control valve 82, into a tank 83. From the tank 83, the film-forming material is forced by means of a pump 84 into a conduit 85, which opens into branch conduits 86 and 87 having filters 88 and 89 mounted therein and provided with control valves 91 and 92, and 93 and 94, respectively. During operation, the film-forming material is directed by the valves 91, 92, 93 and 94 to one or the other of filters 88 and 89, permitting the filter not in use to be cleaned. The film-forming material then enters a conduit 95, which is connected to a heat exchanger 96 through a control valve 97. After leaving the heat exchanger 96, the film-forming material passes through a control valve 98 and through conduit 19 into the header 18 of the hopper 11. A conduit 99, provided with control valves 101 and 102, permits the film-forming material to by-pass the heat exchanger 96 when no heating or cooling of said film-forming material is required prior to its entry into the header 18. A portion of the film-forming material entering the hopper 11, through header 18, will be extruded therefrom. The remainder of the film-forming material passes through the header 18 and conduit 21 into conduit 103, provided with a control valve 104, and is discharged from conduit 103 into the tank 83.

The following examples are given to illustrate this invention further.

Example I

Dope comprising about a 25% solution of cellulose acetate in acetone is passed into the header 18 of the hopper 11 at a pressure of 11–18 pounds per square inch. Of the dope entering the header 18, 30–35% passes through the header without diversion, while the remainder flows through the opening 22 into the body of the hopper. The film-forming material that enters the body of the hopper 11 is thoroughly blended and raised to a temperature of 112° F. as it flows through the passageways 28 and 32 by passing a stream of hot water through the channels 35, after which, the film-forming material is extruded through the aperture 16 to produce a film having a thickness of from 0.00050 to 0.00200 inches. Over an extended period, the average variation in film thickness is less than ±1.7%, with a maximum peak to peak variation of 5%, which is well within commercial limits. In addition, the film is free from low edges and hard spots or other defects.

Example II

Dope comprising about a 25% solution of cellulose acetate in acetone is passed into the hopper 51. The dope is thoroughly blended and raised to a temperature of 108° F. as it flows through the weirs produced by the several knife edge blades mounted between the plates 62, after which, the film-forming materal flows through the aperture 56 to produce a film having a thickness of from 0.003" to 0.010". Over an extended period of time, the average variation in film thickness is less than ± 2.5%, with a maximum peak to peak variation of 9%, which is well within commercial limits. In addition the film is free from low edges and hard spots or other defects.

It is to be understood that the foregoing detailed description is given by way of illustration and that many variations may be made therein without departing from the spirit of our invention.

Having described our invention what we desire to secure by Letters Patent is:

1. Process for preparing films by the extrusion of a film-forming material, which comprises passing a relatively thin, continuous stream of fluent film-forming material having a width substantially equal to that desired in the finished film and having a thickness of less than 0.25 inch in contact with a substantially flat heated surface to bring all of the film-forming material to a uniform temperature and to blend the film-forming material, and shaping the film-forming material to produce a film without materially reducing the width of the stream.

2. Process for preparing films by the extrusion of a film-forming material, which comprises diverting a portion only of a continuously circulating stream of film-forming material along an area having a length substantially equal to the width of the film being prepared, passing the diverted portion of the film-forming material in the form of a relatively thin, continuous stream having a width substantially equal to that desired in the finished film and having a thickness of less than 0.25 inch in contact with a substantially flat heated surface to bring all of the film-forming material to a uniform temperature and to blend the film-forming material, and shaping the film-forming material to produce a film without materialy reducing the width of the stream.

3. Process for preparing films by the extrusion of a film-forming material, which comprises diverting from about 50 to 75% of a continuously circulating stream of film-forming material along an area having a length substantially equal to the width of the film being prepared, passing the diverted portion of the film-forming material in the form of a stream having a width substantially equal to that desired in the finished film and having a thickness of less than 0.25 inch in contact with a substantially flat heated surface to bring all of the film-forming material to a uniform temperature and to blend the film-forming material, and shaping the film-forming material to produce a film without materially reducing the width of the stream.

4. Apparatus for preparing films comprising a hopper having an extrusion aperture, a heating element in operative relation to said hopper positioned in spaced relation to said extrusion aperture, means for feeding a stream of film-forming material to said hopper, and vertically spaced surfaces adjacent to said heating element and cooperating therewith for causing the film-forming material to pass in a relatively thin stream over said heating element to bring all of the film-forming material to a uniform temperature prior to its passage through the extrusion aperture, the construction and arrangement being such that the stream of film-forming material is maintained at a width substantially equal to that desired in the finished film.

5. Apparatus for preparing films comprising a hopper having an extrusion aperture, a heating element in operative relation to said hopper positioned in spaced relation to said extrusion aperture, means for feeding a stream of film-forming material to said hopper, and vertically spaced surfaces adjacent to said heating element and cooperating therewith for causing the film-forming material to pass over said heating element in the form of a film having a thickness of less than 0.25 inch to bring all of the film-forming material to a uniform temperature prior to its passage through the extrusion aperture, the construction and arrangement being such that the stream of film-forming material is maintained at a width substantially equal to that desired in the finished film.

6. Apparatus for preparing films comprising a hopper having an extrusion aperture, a passageway in said hopper for permitting a stream of film-forming material to pass therethrough, means for diverting to said extrusion aperture a portion only of said film-forming material along an area of said passageway having a length substantially equal to the width of the finished film, a heating element in operative relation to said hopper between said passageway and said extrusion aperture, vertically spaced surfaces adjacent to said heating element and cooperating therewith for causing the film-forming material to pass in a relatively thin stream over said heating element to bring all of the film-forming material to a uniform temperature prior to its passage through the extrusion aperture.

7. Apparatus for preparing films comprising a hopper having an extrusion aperture, a passageway in said hopper for permitting a stream of film-forming material to pass therethrough, means for diverting to said extrusion apertures a portion only of said film-forming material along an area of said passageway having a length substantially equal to the width of the finished film, a heating element in operative relation to said hopper between said passageway and said extrusion aperture, vertically spaced surfaces adjacent to said heating element and cooperating therewith for causing the film-forming material to pass over said heating element in the form of a film having a thickness less than 0.25 inch to bring all of the film-forming material to a uniform temperature prior to its passage through the extrusion aperture.

8. Apparatus for preparing films comprising a hopper having an extrusion aperture, a substantially flat plate in operative relation to said hopper positioned in spaced relation to said extrusion aperture, means for heating said plate, means for feeding a stream of film-forming material to said hopper, and vertically spaced surfaces adjacent to said heating element and cooperating therewith for causing the film-forming material to pass in a relatively thin stream over said plate to bring all of the film-forming material to a uniform temperature prior to its passage through the extrusion aperture, the construction and arrangement being such that the stream of film-forming material pass to said plate and leaving said plate is maintained at a width substantially equal to that desired in the finished film.

9. Apparatus for preparing films comprising a hopper having an extrusion aperture, a plurality of horizontally disposed plates in operative relation to said hopper positioned in spaced relation to said extrusion aperture, means for heating at least one of said plates, said plates being spaced apart vertically a distance sufficient to form a relatively thin film therebetween, whereby all of the film-forming material is brought to a uniform temperature prior to its passage through the extrusion aperture, the construction and arrangement being such that the stream of film-forming material is maintained at a width substantially equal to that desired in the finished film.

10. Apparatus for preparing films comprising a hopper having an extrusion aperture, a plurality of horizontally disposed plates in operative relation to said hopper positioned in spaced relation to said extrusion aperture, means for heating at least one of said plates, said plates being spaced apart vertically a distance sufficient to form therebetween a stream of film-forming material having a thickness of less than 0.25 inch, whereby all of the film-forming material is brought to a uniform temperature prior to its passage through the extrusion aperture, the construction and arrangement being such that the stream of film-forming material is maintained at a width substantially equal to that desired in the finished film.

11. Apparatus for preparing films comprising a hopper having an extrusion aperture, a passageway in said hopper for permitting a stream of film-forming material to pass therethrough, means for diverting to said extrusion aperture a portion only of said film-forming material along an area of said passageway having a length substantially equal to the width of the finished film, a plurality of horizontally disposed plates in operative relation to said hopper positioned in spaced relation to said extrusion aperture, means for heating at least one of said plates, said plates being spaced apart vertically a distance sufficient to form a relatively thin film therebetween, whereby all of the film-forming material is brought to a uniform temperature prior to its passage through the extrusion aperture.

12. Apparatus for preparing films comprising a hopper having an extrusion aperture, a passageway in said hopper for permitting a stream of film-forming material to pass therethrough, means for diverting to said extrusion aperture a portion only of said film-forming material along an area of said passageway having a length substantially equal to the width of the finished film, a plurality of horizontally disposed plates in operative relation to said hopper positioned in spaced relation to said extrusion aperture, means for heating at least one of said plates, said plates being spaced apart vertically a distance sufficient to form therebetween a stream of film-forming material having a thickness of less than 0.25 inch, whereby all of the film-forming material is brought to a uniform temperature prior to its passage through the extrusion aperture.

13. Apparatus for preparing films comprising a hopper having an extrusion aperture, a substantially flat plate in said hopper positioned in spaced relation to said extrusion aperture, means for heating said plate, means for feeding a stream of film-forming material to said hopper, and a plurality of blades forming with said plate a weir for causing the film-forming material to pass over said plate in the form of a film having a thickness of less than 0.25 inch to bring all of the film-forming material to a uniform temperature prior to its passage through the extrusion aperture, the construction and arrangement being such that the stream of film-forming material pass to said plate and leaving said plate is maintained at a width substantially equal to that desired in the finished film.

14. Apparatus for preparing films comprising a hopper having an extrusion aperture, a substantially flat plate in said hopper positioned in spaced relation to said extrusion aperture, means for heating said plate, means for feeding a stream of film-forming material to said hopper, a plurality of blades forming with said plate a weir for causing the film-forming material to pass over said plate in the form of a film having a thickness of less than 0.25 inch to bring all of the film-forming material to a uniform temperature prior to its passage through the extrusion aperture and a float for automatically maintaining a constant level of a film-forming material between said plates, the construction and arrangement being such that the stream of film-forming material pass to said plate and leaving said plate is maintained at a width substantially equal to that desired in the finished film.

References Cited in the file of this patent

UNITED STATES PATENTS

| Number | Name | Date |
| --- | --- | --- |
| 1,990,078 | Kinsella | Feb. 5, 1935 |
| 2,026,740 | Kinsella | Jan. 7, 1936 |
| 2,045,328 | Levey | June 23, 1936 |
| 2,253,176 | Graves | Aug. 19, 1941 |
| 2,254,203 | Bender | Sept. 2, 1941 |
| 2,327,627 | Esselen | Aug. 24, 1943 |
| 2,356,634 | Opel | Aug. 22, 1944 |
| 2,501,595 | Bohannon | Mar. 21, 1950 |